Sept. 14, 1926.                    S. C. BARNES                    1,599,632

ATTACHED LUG

Filed Jan. 28, 1926

INVENTOR.
Stuart C Barnes

Patented Sept. 14, 1926.

1,599,632

UNITED STATES PATENT OFFICE.

STUART C. BARNES, OF DETROIT, MICHIGAN, ASSIGNOR TO HAYES WHEEL COMPANY, OF JACKSON, MICHIGAN, A CORPORATION OF MICHIGAN.

ATTACHED LUG.

Application filed January 28, 1926. Serial No. 84,283.

This invention relates to demountable rims. It is the object of the invention to provide a very simple form of attached lug construction which has a maximum of strength in its anchorage to the demountable rim.

In the attached lugs of the prior art, it has been recognized that one of the great problems is to relieve the pulling stresses on the rivets which tend to pull the rivet heads out and dislodge the lug from the demountable rim. In so far as I am aware, all the attached lugs of the prior art depend largely for anchorage on the enlarged head of the rivet. It has been recognized that this is a rather insecure fastening, and attempts have been made to modify or relieve these pulling strains by placing the lug up against an abutment, such as an inwardly projecting bead, or something of this kind.

It is the object of the present invention to afford a lug construction in which it is practically impossible to dislodge the lug without completely deforming the demountable rim, and in which the rivet itself takes very little strain—being largely only a locating device to locate the lug in its anchorage seat.

In the base of the demountable rim depressions or sinks $a$ are pressed in the stud slots $b$. At the same time a long slot $c$ is punched out to receive the body of the lug.

Figure 1:
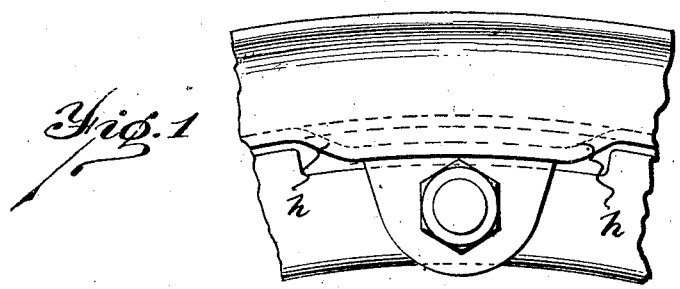
Fig. 1 is a fragmentary view of the demountable rim secured to the fixed rim, embodying my invention.
Figure 2:
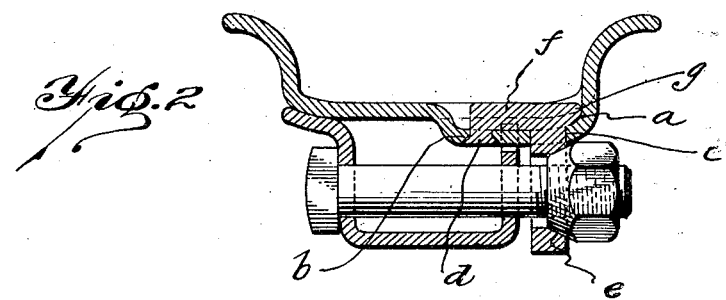
Fig. 2 is a cross section of same.
Figures 3, 4:
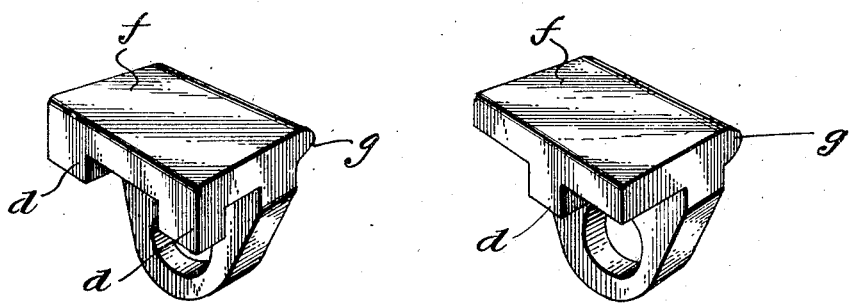
Fig. 3 is a perspective of a two-stud lug.
Fig. 4 is a perspective of a single stud lug.
Figure 5:
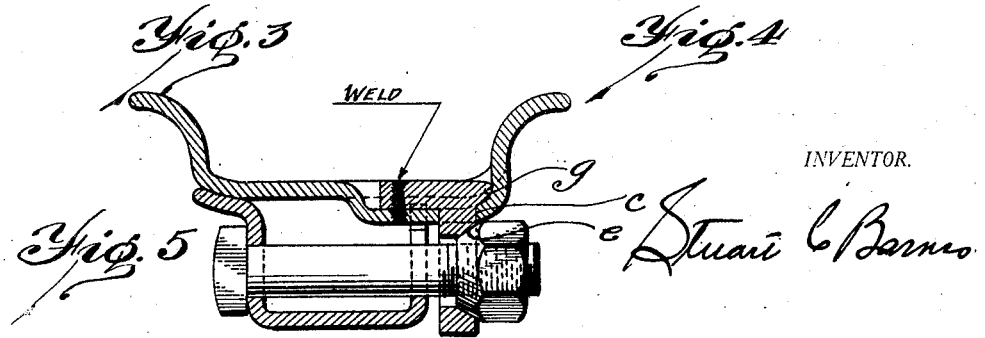
Fig. 5 is a section showing a lug welded to its seat.

Two types of riveting studs are shown in Figs. 3 and 4. The one in Fig. 3 is made of two integral rivet studs $d$, while the one in Fig. 4 is made of a single integral rivet stud. These lugs are preferably made out of roll bar stock and then are sheared and punched out to give the rivet studs, and the proper contour to the body of the lug. This lug is bored for the bolt opening, and preferably counterbore as at $e$.

The anchoring web $f$ of the lug preferably overhangs the body of the lug as at $g$, making an anchoring ledge which tends to resist any effort to pull the lug loose from the demountable rim. This ledge may be omitted and measurably good results will still be accomplished, but it will be obvious that this overhanging ledge performs a very useful function in relieving the rivet head of almost all strains in attempting to dislodge the lug from the rim. If the ledge be not used there would be a certain tendency of the entire lug to fulcrum where it goes through the demountable rim, and this tendency will have to be resisted by the enlarged rivet head. On the other hand, where the overhanging anchoring ledge is used, this will resist any fulcruming tendency and it will be obvious that no strain of a substantial nature is put on the rivet head until the forces of distortion are so great as to distort the material of the demountable rim itself. This material stands in the path of any tendency of the lug to fulcrum. It will therefore be apparent that the rivet $d$ in such a construction is more or less simply a seating device for clamping the lug to its seat, and that when the strain of service is upon the lug the tendency of the lug is simply to be brought down tighter on its seat and the lug cannot be dislodged without substantially distorting and breaking the demountable rim. It is therefore apparent that it is possible to satisfactorily anchor the lug with the single rivet stud where heretofore it has been the common practice to use two rivet studs. This eliminates one riveting operation in applying the lug to the demountable rim. It will also be apparent that the integral lug is not a necessary concomitant of this invention, for obviously the lug could be secured in its seat by separate rivets, by welding, brazing, or otherwise.

In fact this type of lug lends itself very nicely to a spot-welding operation for the reason that there is little strain on the weld itself. Where a spot weld is used it of course eliminates the necessity of the rivet slots in the demountable rim material. Hence the only slot is that to permit the passage of the leg of the lug. This does not weaken the material of the rim to a much greater extent than the usual slotting of the rim for the purpose of receiving the riveting studs. Furthermore, such weakness as might otherwise appear on this account is more than compensated by the additional strength afforded to the section of the rim at this point by the corrugated effect, resulting from depressing the material to form the lug seat. In other words, the angle walls *h* at the two ends of the sink or depression strengthen the section of the rim at this point on either side of the lug slot so as to compensate for the loss of material by cutting out the lug slot.

What I claim is:

1. In a demountable rim, the combination of a metal rim member provided with a slot, and an attached lug having a leg let into the rim or slot from the outside periphery and having an anchoring portion overlying the outside periphery to form an anchorage.

2. In a demountable rim, the combination of a rim member provided with a slot in its periphery, and an attached lug having a leg portion let into the said slot from the outside periphery, provided with enlarged anchoring portions that overlie the outside periphery of the rim.

3. In a demountable rim, the combination of a rim member having a slot in its periphery, and an attached lug of angle section let into the rim member from the outside with the leg portion of the lug passed through the slot and the angle portion of the lug overlying the outside periphery of the rim.

4. A demountable rim having in combination a slotted rim member, an attached lug provided with an anchoring portion and a leg portion, the leg portion adapted to pass through the slot in the rim from the outside periphery, leaving the anchoring portion overlying the outside of the periphery, said anchoring portion extending to both sides of the said leg to prevent fulcruming of the lug.

5. In a demountable rim, the combination of a slotted rim member, an angle form of attached lug having a leg portion passed through the slot with the anchoring portion remaining on the outside periphery of the rim, and means for fastening the anchoring portion to its seat.

6. In a demountable rim, the combination of a slotted rim member, an angle type of attached lug having a leg portion passing through the slot in the rim, leaving the anchoring portion on the outside of the rim with an overhanging ledge to prevent fulcruming of the lug, and means for fastening the lug to its seat.

7. In a demountable rim, the combination of a slotted rim member including a rivet stud slot, and an angle type of attached lug having a leg portion passing through the main slot, leaving the anchoring web on the outside of the rim and having an integral rivet stud passing through the rivet stud slot and upset.

8. In a demountable rim, the combination of a slotted rim member including a rivet stud slot, and an angle type of attached lug having a leg portion passing through the main slot, leaving the anchoring web on the outside of the rim and having an integral rivet stud passing through the rivet stud slot and upset, said anchoring portion extending on both sides of the leg to prevent tilting of the lug under strain.

9. In a demountable rim, the combination of a metal rim member provided with a depressed or sink portion in its base, and an attached lug having a leg portion and an anchor portion, the latter wholly contained in the depression and on the outside of the rim member.

10. In a demountable rim, the combination of a metal rim member having a depression pressed in on the outside of the base of the rim, said depression provided with a slot, and an angle type of attached lug having a leg let into the said slot from the outside of the base of the rim and having the anchoring portion of the lug resting in said depression.

11. In a demountable rim, the combination of a metal rim member having a depression pressed in on the outside of the base of the rim, said depression provided with a slot, an angle type of attached lug having a leg let into the said slot from the outside of the base of the rim and having the anchoring portion of the lug resting in said depression, and means for fastening the lug to its seat.

12. In a demountable rim, the combination of a metal rim member having a depression pressed in on the outside of the base of the rim, said depression provided with a slot, an angle type of attached lug having a leg let into the said slot from the outside of the base of the rim and having the anchoring portion of the lug resting in said depression, the anchoring portion of the lug having an overhanging ledge on the side of the leg opposite the main portion of the anchor.

13. In a demountable rim, the combination of a metal rim member having a depression pressed in on the outside of the base of the rim, said depression provided with a slot, an angle type of attached lug having a leg let into the said slot from the outside of the base of the rim and having the anchoring portion of the lug resting in said depression, the anchoring portion of the lug having an overhanging ledge on the side of the leg opposite the main portion of the anchor, and means for holding the anchor portion of the lug to its seat.

14. In a demountable rim, the combination of a metal rim member having a depression pressed in on the outside of the base of the rim, said depression provided with a slot, and an angle type of attached lug having a leg let into the said slot from the outside of the base of the rim and having the anchoring portion of the lug resting in said depression, the anchoring portion of the lug having an overhanging ledge on the side of the leg opposite the main portion of the anchor, said anchor portion of the lug being provided with an inwardly projecting integral rivet stud upset on the inside of the rim for the purpose of seating the lug on its seat.

In testimony whereof I have affixed my signature.

STUART C. BARNES.